United States Patent
Scott et al.

(10) Patent No.: US 9,317,677 B1
(45) Date of Patent: Apr. 19, 2016

(54) ACCESS CONTROL FOR CONTENT DELIVERY NETWORKS

(71) Applicant: Inkling Systems, Inc., San Francisco, CA (US)

(72) Inventors: Robert Benjamin Scott, San Francisco, CA (US); Arthur Kopatsy, San Francisco, CA (US); Ned Todd Birdwell Rockson, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 85 days.

(21) Appl. No.: 13/902,535

(22) Filed: May 24, 2013

(51) Int. Cl.
*G06F 21/44* (2013.01)

(52) U.S. Cl.
CPC .................................... *G06F 21/44* (2013.01)

(58) Field of Classification Search
CPC .. G06F 21/42; H04L 2209/04; H04L 41/0293
USPC .......................................................... 726/4, 5
See application file for complete search history.

(56) References Cited

U.S. PATENT DOCUMENTS

| | | | |
|---|---|---|---|
| 2005/0278259 A1* | 12/2005 | Gunaseelan et al. | 705/59 |
| 2007/0250560 A1* | 10/2007 | Wein et al. | 709/201 |
| 2009/0007241 A1* | 1/2009 | Tewari et al. | 726/4 |
| 2011/0107431 A1* | 5/2011 | Sukanen | 726/27 |
| 2012/0124372 A1* | 5/2012 | Dilley et al. | 713/162 |
| 2012/0255036 A1* | 10/2012 | Kidder | 726/29 |
| 2012/0275597 A1* | 11/2012 | Knox et al. | 380/210 |
| 2012/0324552 A1* | 12/2012 | Padala et al. | 726/6 |
| 2013/0054675 A1* | 2/2013 | Jenkins et al. | 709/203 |

* cited by examiner

*Primary Examiner* — Harunur Rashid
(74) *Attorney, Agent, or Firm* — Ascenda Law Group, PC

(57) ABSTRACT

Content items are distributed to a content delivery network using identifiers that expresses relationships between the content items and at least one associated content element. When making requests to content delivery network, a requesting Web browser may thus specify the content items according to uniform resource locators that include credentials that allow the content delivery network to verify that the browser is authorized to receive the content items. These uniform resource locators may uniquely associate the content items with the associated content element and the requesting browser in a cryptographically secure manner.

4 Claims, 5 Drawing Sheets

ACCESS CONTROL FOR CONTENT DELIVERY NETWORKS

FIELD OF THE INVENTION

The present invention relates to methods and systems for controlling access to content items that are related to one another and are distributed via content delivery networks or similar distribution systems.

BACKGROUND

Content delivery networks (CDNs) are often used to deliver content to requesting clients in order to reduce latency between a requesting client and a content source. However, CDNs typically do not permit fine-grained access control over items served using the resources of the CDN. As a result, where content providers wish to maintain such fine-grained control, the content providers are either forced to incur the load at their respective origin servers or duplicate content items many times over to accommodate the coarser access controls facilitated through the CDNs. Neither solution is particularly appealing.

SUMMARY OF THE INVENTION

In one embodiment, one or more content items are distributed from an origin server to a server in a content delivery network using identifiers that expresses relationships between the content items and at least one associated content element. The origin server further provides a requesting Web browser associated with a client computer credentials to be used by the server in the content delivery network for verifying that the browser is authorized to receive a content item and its associated content elements. The content items may be identified with uniform resource locators that uniquely associate the content items with the associated content element in a cryptographically secure manner. The uniform resource locators may include identifiers for the associated content element and asset signatures that are fashioned using identifiers for the content items, the content element and an agreed-upon credential, for example a shared secret or a public key, etc. The credentials provided to the browser may include a request signature that uniquely associates the requesting browser with the content elements. When making requests to the server in the content delivery network, the requesting Web browser may thus specify the content items according to uniform resource locators that include the credentials provided by the origin server.

BRIEF DESCRIPTION OF THE DRAWINGS

The present invention is illustrated by way of example, and not limitation, in the figures of the accompanying drawings in which.

DETAILED DESCRIPTION

Described herein are methods and systems for controlling access to content items distributed via content delivery networks. By "content items" we mean media objects that may be formatted according to a variety of computer-readable or interpretable formats, as described more fully below, and which include human perceptible (e.g., readable or recognizable) content, such as images (either still or moving), audio files, etc. In some instances, content items may be "cards" or "media cards", which are instantiations of markup language, e.g., extensible markup language ("XML"), hypertext markup language ("HTML"), or the like, files. Such cards may include, among other things, one or more text sections, one or more image sections, image captions, and header sections, all arranged in a desired order. A collection of related cards may form an electronic content work, for example an electronic book, magazine, article, etc., or a portion thereof, e.g., a section or chapter thereof, etc. A collection of content items may be included in a Web page or similar content element.

Figure 1:
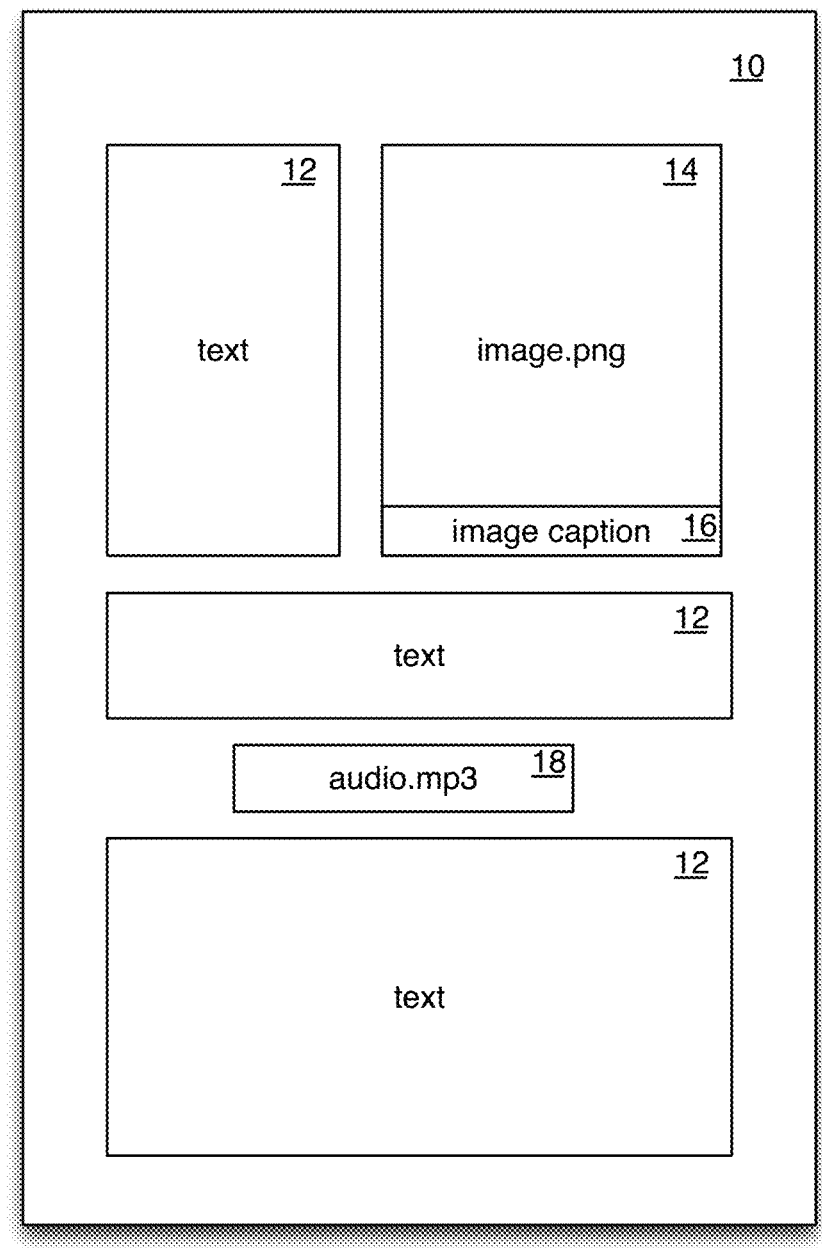
FIG. 1 illustrates an example of a Web page having multiple content items associated therewith.

FIG. 1 illustrates an example of a content element, in particular a Web page 10. Web page 10 includes one or more content items, such as text sections 12, one or more images 14, which may have associated captions 16, and one or more media objects, such as audio file 18. Typically, the content items that comprise Web page 10 will be stored separately from the Web page itself and may often be included in other Web pages or available as separate content elements themselves. Accordingly, each Web page and the content items that comprise the Web page often have their own identifiers, for example their own uniform resource locators (URLs). When a browser running on a client requests the Web page, the server hosting the page returns hypertext markup language (HTML) instructions that inform the browser where the various content items that make up the page can be located and the browser issues separate requests to those addresses for the content items. As the individual content items are returned, the browser assembles them according to the HTML instructions that define the Web page and presents same to a user as if the various content items were a single "page".

As indicated above, in order to ease the load on origin servers (e.g., servers where the originals of the content elements and content items are located) and to provide better user experiences (e.g., by reducing latencies associated with requests for the content elements and content items), content providers often rely on CDNs for distributing content elements and content items. In such instances, requests for content elements and/or content items issued by browsers are redirected to one of the CDN's servers best situated to handle the request. Of course, this requires that the origin server provide the requested content to the CDN either in advance of the request or, sometimes, as a result of the request.

Figure 2:
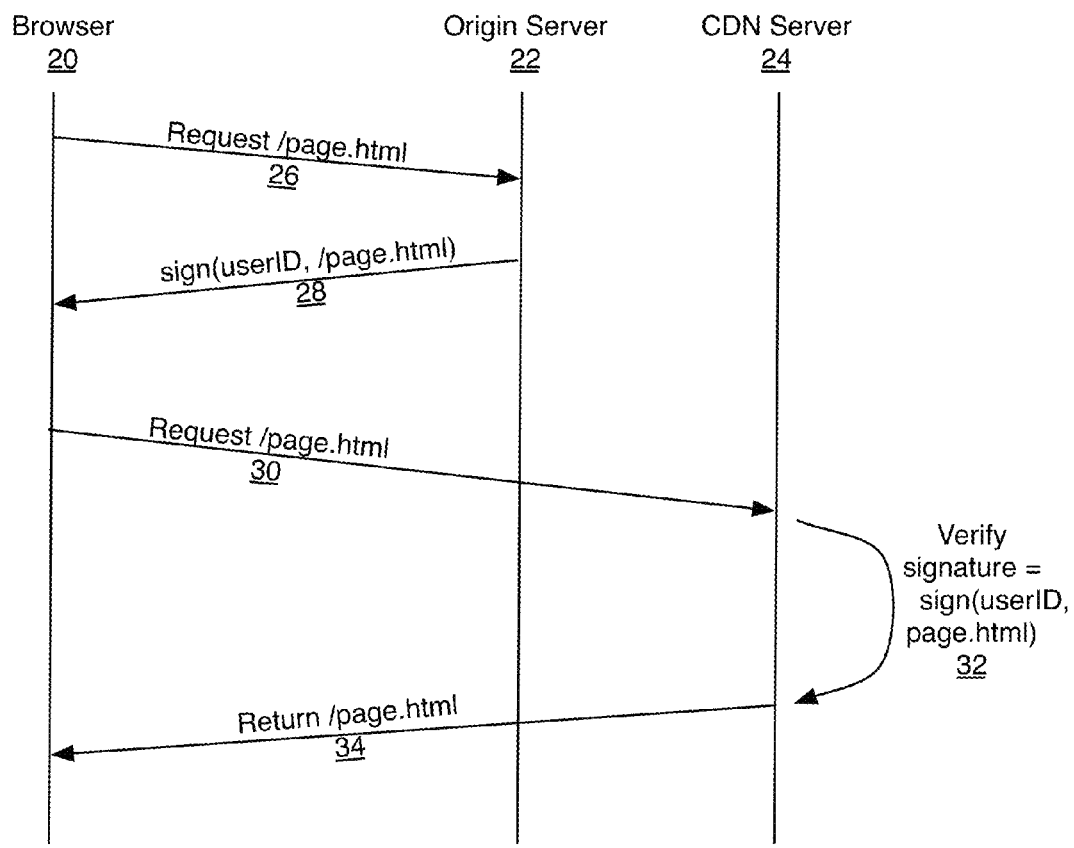
FIG. 2 illustrates an example of a convention process for authenticating content elements with a CDN.

In cases where the Web page requested by the browser is one that is available only to authorized users, the CDN server needs some way of verifying that the user requesting the page is authorized to receive it. FIG. 2 illustrates one example of how this authentication may be facilitated. As shown, when a browser 20 issues a request 26 for a Web page (page.html) to the origin server 22, the origin server instructs the browser to request the page from the CDN using a signature 28 that associates a user (client) identifier (user ID) and the requested asset (page.html). Now when the browser requests 30 page-.html from the CDN server 24, it includes the signature specified by the origin server. The CDN server verifies 32 this signature (e.g., by checking with the origin server or a separate authentication server), and if the signature is valid returns 34 the requested page.html to the browser.

This scheme works well for verifying access to the Web page (page.html), but notice that when the browser makes a subsequent request for content items associated with the Web page, for example image 14 and/or audio file 18, there is no mechanism by which the CDN server can verify that the browser (i.e., the user associated with the browser) is authorized to receive those content items. That is, the access control facilitated by this mechanism is rather coarse, operating only at the content element level, and not at the level of the individual content items that may make up the entire content element. If a content provider wished to use the above-described scheme to control access to content items, it would require duplicating the content items in each Web page in which they appear so that the CDN server could separately authenticate each page and provide same, or not, according to the information presented by a requesting browser. This would be highly inefficient in terms of storage utilizations and content development.

Figure 3:
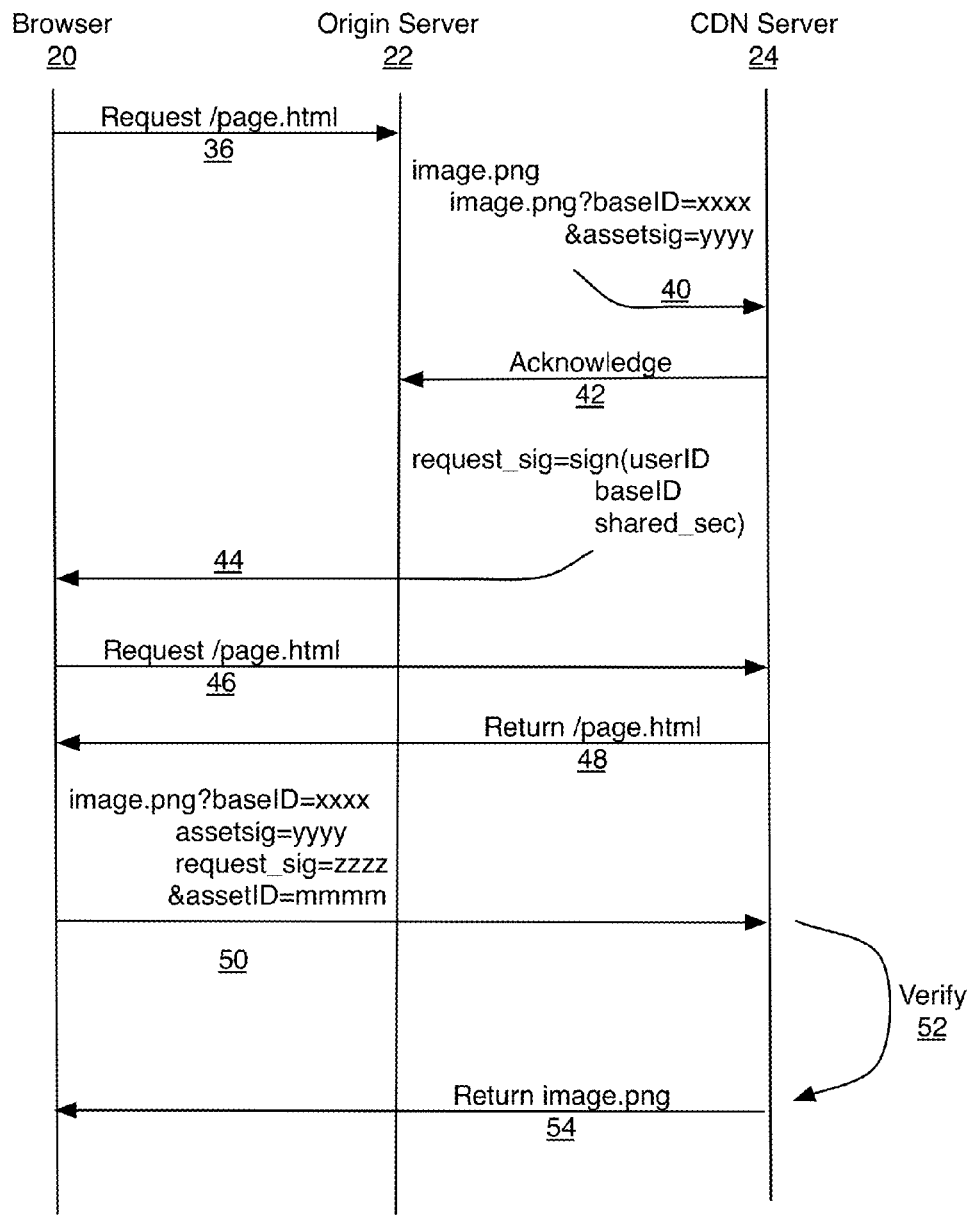
FIG. 3 illustrates an example of a process for facilitating authentication of individual content items by a CDN in accordance with an embodiment of the present invention.
Figure 4:
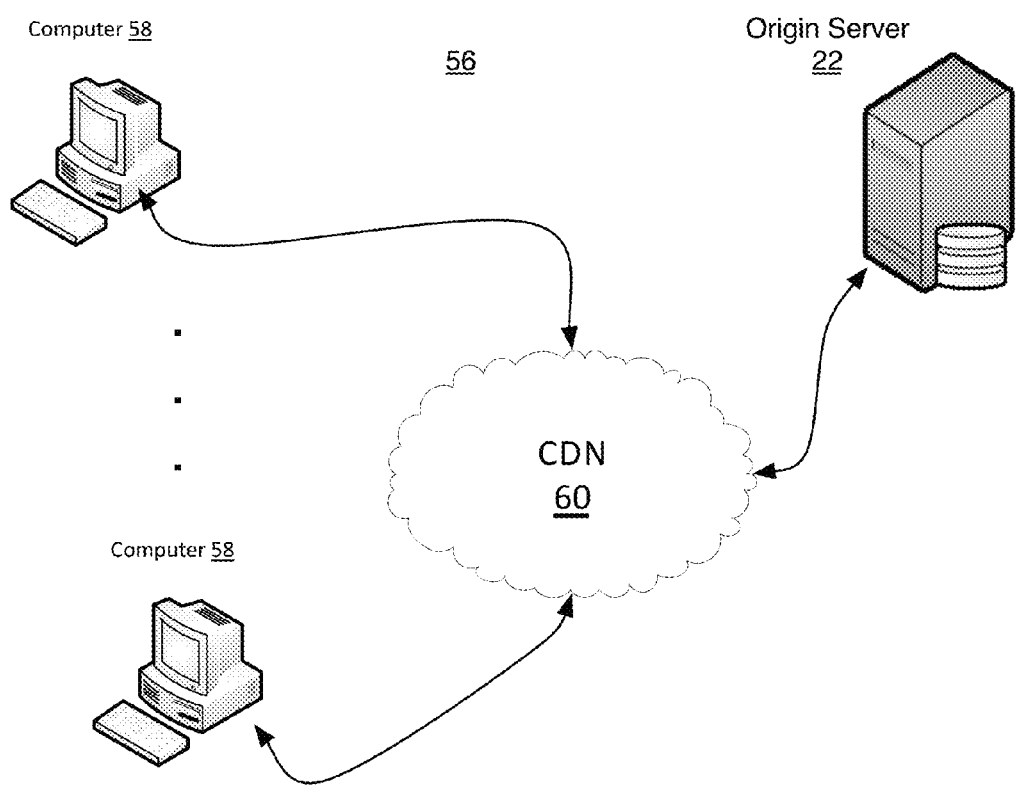
FIG. 4 illustrates an example of a CDN used by an origin server to distribute content to various client computers.

The present invention alleviates this problem by allowing individual content items to be authenticated by the CDN. This is done by first expressing the relationships between content items and content elements (or between related content elements or related content items), and second authenticating the fact that those relationships are permitted for a particular user (client). FIG. 3 illustrates an example of this process and FIG. 4 illustrates a general system configuration in which such processes may be implemented.

As before, a browser 20 (e g, running on a computer 58) issues a request 36 to an origin server 22 for a Web page, such as Web page 10. For purposes of this example, assume that the Web page includes a content item, image.png, which the content owner has determined should be available only to authorized users (clients). In order to provide the CDN server 24 (which may be one of a number of such servers in a CDN 60) a mechanism for enforcing this policy, before the origin server passes the content item to the CDN server, it rewrites the URL for the content item to include an identifier (baseID) for the requested Web page and a signature for the content item. In this example, the URL for the image is rewritten from /image.png to /image.png?baseID=xxxx&assetsig=yyyy. The baseID can be any unique identifier for the subject Web page, and the asset signature may be of the form assetsig=sign(assetID, baseID, credentials)

where assetID is a unique name or other identification for the content item, and credentials are a data item known to the origin server and CDN server (e.g., a shared secret or public key/private key pair, etc.) and used to authorize and verify each asset signature. The baseID could also include additional information (e.g., a time-to-live or other expiration indicator, etc.) and such additional metadata could be added to the URL as discussed below. The credentials may be any customary data element of this type, as are commonly employed in cryptographic communications between computer devices. The asset signature binds the content item (in this case image.png) to the baseID of the requested content element. This procedure is repeated for all content items associated with the requested Web page that require authentication an the new URLs are provided 40 to the CDN server, which acknowledges 42 their receipt.

The new URLs for the content items define relationships between those content items and associated content elements (or between related content elements or related content items). The origin server now creates bindings that allow the CDN server to recognize that those content items are authorized for a particular user (client). This is done by creating request signatures that the browser 20 will pass to the CDN server as part of its requests for the content items. In this example, the request signature is of the form request_sig=sign(userID, baseID, credentials)

where userID is a unique name or other identification for the user (client), baseID is the unique identifier for the requested content element and credentials are the same credentials used in connection with the asset signature.

Now when the browser requests 46 the content element (e.g., the Web page) from the CDN server 24, and the CDN server provides 48 the requested content element, for each content item included in the content element the browser issues a further request 50, but the URLs of the content items are rewritten to be of the form image.png?baseID=xxxx
&assetsig=yyyy
&request_sig=zzzz
&assetID=mmmm where the request signature is included as part of the URL. This affords the CDN server the ability to verify 52 that the user/browser is permitted access to the requested content item, in the context of the subject content element. Note that although the verification is shown in a single transaction it is actually a two-step procedure, with the request signature and the asset signature being separately verified. As a result, the CDN server will return 54 the requested content item to the browser. Rewriting the URLs for the content items in this fashion may be facilitated either using a plug-in or other software (e.g., a player) running in the browser or the content element (e.g., Web page) itself may be encoded to specify the URLs as javascript that resolves to the required format. Of course, although not shown it should be apparent that if the CDN server is unable to verify that the user (client) is permitted to access the requested content item or content item, then the content item is not returned to the user/browser.

From the above discussion it should be apparent that instantiations of the methods or processes described herein may be executable as computer software (i.e., computer readable instructions) on various computer-based (or processor-based) devices. Such devices may include any electronic device capable of performing the actions described above (using suitable programming) and, where applicable, processing the information for display so as to properly convey the information. Examples of such devices include servers, personal computers, tablet computers, and the like, which devices include one or more processors that are temporarily configured (e.g., by software) or permanently configured to perform the relevant operations. Where the present methods are instantiated as software, such software may be written in any form of programming language, including compiled or interpreted languages, and it may be deployed in any form, including as a stand-alone program or as a module, subroutine, or other unit suitable for use in a computing environment. The software may be deployed to be executed on one computer system or on multiple computer systems at one site or distributed across multiple sites and interconnected by a communication network. At times, the software may be embodied on a computer program product, for example as a computer program tangibly embodied in an information carrier such as a non-transitory machine-readable medium, for execution by, or to control the operation of, a programmable processor. Example embodiments may also be implemented in digital electronic circuitry, in firmware, or in various combinations of circuitry, firmware and software.

Figure 5:
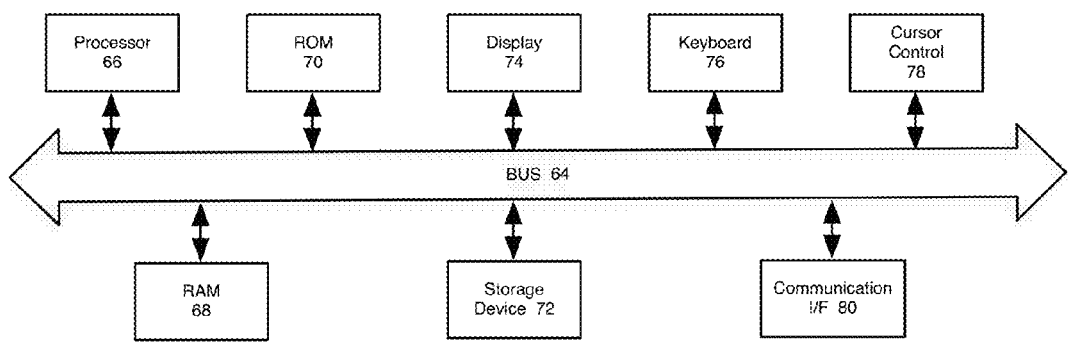
FIGS. 5 and 6 illustrate examples of computing environments suitable for use in accordance with embodiments of the present invention.
Figure 6:
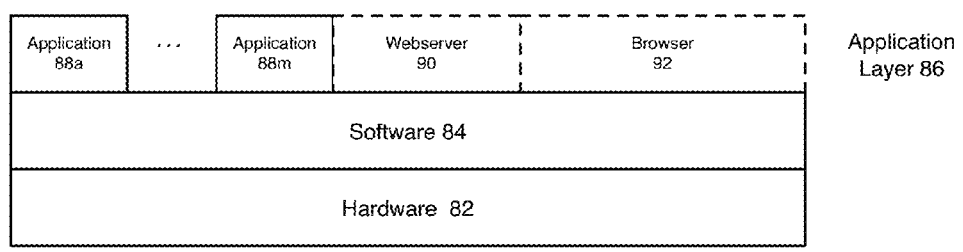

FIGS. 5 and 6 illustrate examples of a computing environment 62, which in various instantiations may be a CDN server, origin server or client computer. Note, not all of the various computer systems may have all of the features of computing environment 62. For example, certain of the servers discussed above may not include a display inasmuch as a client computer communicatively coupled to the server may provide the display function. Such details are not critical to the present invention.

Computing environment 62 includes a bus 142 or other communication mechanism for communicating information, and a processor 66 coupled with the bus for processing information. Computing environment 62 also includes a main memory 68, such as a random access memory (RAM) or other dynamic storage device, coupled to the bus for storing information and instructions to be executed by the processor. Main memory 68 also may be used for storing temporary variables or other intermediate information during execution of instructions to be executed by processor 66. Computing environment 62 further includes a read only memory (ROM) 70 or other static storage device coupled to the bus for storing static information and instructions for the processor 66. A storage device 72, which may be one or more of a hard disk, flash memory-based storage medium, or other non-transitory storage medium, is provided and coupled to the bus 64 for storing information and instructions (e.g., operating systems, applications programs and the like).

Computing environment 62 may be coupled via the bus 64 to a display 74, such as a liquid crystal or light emitting diode display, for displaying information to a user. An input device 76, such as a keyboard including alphanumeric and other keys, is coupled to the bus for communicating information and command selections to the processor. In some embodiments, the keyboard will be a software construct rendered via a touch screen display. Another type of user input device is cursor control device 78, such as a mouse, a trackball, or cursor direction keys for communicating direction information and command selections to processor 66 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 66 executing appropriate sequences of computer-readable instructions contained in main memory 70. Such instructions may be read into main memory from another computer-readable medium, such as storage device 72, and execution of the sequences of instructions contained in the main memory causes the processor to perform the associated actions. In alternative embodiments, hard-wired circuitry or firmware-controlled processing units may be used in place of or in combination with processor 66 and its associated computer software instructions to implement the invention.

Computing environment 62 also includes a communication interface 80 coupled to the bus. Communication interface 80 provides a two-way data communication channel with a computer network, such as CDN 60 in FIG. 4, which provides connectivity to and among the various devices discussed above. For example, communication interface 80 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computing environment 62 can send and receive information through the communication interface and in that way communication with other computer systems are possible. Computing environment 62 may also include additional capabilities and facilities, such as a power unit, which may comprise a battery, a power port, one or more antennae, one or more data ports, and one or more wireless communication modules.

FIG. 6 illustrates computing environment 62 from the point of view of its software architecture. Computing environment 62 may be any of the clients or servers referred to above, with appropriate applications comprising a software application layer 86. The various hardware components of computing environment 62 are represented as a hardware layer 82. An operating system 84 abstracts the hardware layer and acts as a host for various applications 88a-88m, that run within computing environment 62. In the case of a server, the operating system may act as a host for a webserver application 90, which is configured to perform the processes described above. For a client computer, the operating system may host a Web browser application 92.

In the foregoing description, certain transaction diagrams have been shown and processes described in relation to those diagrams that provide a reference for discussion purposes. In an actual implementation of the methods of the present invention, the steps can comprise event-driven routines that can run in parallel and can be launched and executed other than as shown by the simple depiction in the transaction diagrams. In short, the particular order of the steps in the diagrams is illustrative of the invention, but not limiting of the various permutations that can be achieved in a given embodiment. Accordingly, it is the performance of the steps recited in the claims appended below which is pertinent, and not the order of operation of the steps themselves.

Thus, methods and systems for controlling access to content items distributed via content delivery networks have been described.

What is claimed is:
1. A computer-implemented method, comprising
distributing, from an origin server, a plurality of content items to a server in a content delivery network, the content items each being identified in a manner that expresses relationships between a respective one of the content items and an associated content element, wherein the content element and the respective one of the content items represent a portion of an electronic content work such as an electronic book, magazine, or article, and
providing a requesting Web browser associated with a client computer a request signature that is based on a client identifier, a content element identifier, and trusted credentials to be used by the server in the content delivery network for verifying that the browser is authorized to receive the content items and the associated content element, wherein the credentials comprise a request signature that uniquely associates the requesting browser with the content elements,
wherein during loading of the content element from the server in the content delivery network, the requesting Web browser specifies, for each respective one of the content items, uniform resource locators that include bindings that uniquely associate the content items with the associated content element in a cryptographically secure manner, comprising: the content element identifier; a unique identifier for the respective access-restricted content item that is based on an identifier for the content element, an asset identifier for the respective access-restricted content item, and the trusted credentials; the request signature; and the content item identifier.

2. A computer-implemented method, comprising:
receiving, at a server of a content delivery network (CDN), a resource request from a requesting browser associated with a client, the resource request identifying a content element that comprises content items, wherein the content element and the content items represent a portion of an electronic content work such as an electronic book, magazine, or article, a plurality of which content items are access-restricted content items, the access-restricted content items each having an associated unique identifier, wherein the unique identifier for each respective access-restricted content item is based on an identifier for the content element, an asset identifier for the respective access-restricted content item, and the common trusted credentials known to an origin server and the CDN server, wherein the credentials comprise a request signature that uniquely associates the requesting browser with the content elements;
determining, by the server and without contacting the origin server for the content element, whether the client is authorized to receive the access-restricted content items;
and, if so, returning the access-restricted content items to the client, otherwise, not returning the access-restricted content items to the client,
wherein the determination is made according to subsequent resource requests from the client for each respective access-restricted content item and said subsequent resource requests use a uniform resource locator formatted to express a binding between each respective access-restricted content item and the content element in a manner that facilitates validation of the client's authorization to receive the respective access-restricted content item according to common trusted credentials within each of said subsequent resource requests, wherein the binding uniquely associates each respective content item with the associated content element in a cryptographically secure manner.

3. A content delivery network (CDN) server, comprising:
an interface configured to receive a resource request from a browser associated with a client, the resource request identifying a content element that comprises content items, wherein the content element and the content items represent a portion of an electronic content work such as an electronic book, magazine, or article, a plurality of which content items are access-restricted content items, the access-restricted content items each having an associated unique identifier wherein the unique identifier for each respective access-restricted content item is based on an identifier for the content element, an asset identifier for the respective access-restricted content item, and the common trusted credentials known to an origin server and the CDN server, wherein the credentials comprise a request signature that uniquely associates the requesting browser with the content elements;
a processor configured to determine, without contacting the origin server for the content element, whether the client is authorized to receive the access-restricted content items;
and, if so, to effect a return of the access-restricted content items to the client, otherwise, to not effect the return of the access-restricted content items to the client,
wherein the determination is made according to subsequent resource requests received from the client for each respective access-restricted content item, and said subsequent resource requests use a uniform resource locator formatted to express bindings between each respective access-restricted content items and the content element in a manner that facilitates validation of the client's authorization to receive the respective access-restricted content item according to common trusted credentials within each of said subsequent resource requests, wherein the bindings uniquely associate the content items with the associated content element in a cryptographically secure manner.

4. The server of claim 3 wherein the resource request includes an identifier for the content element as well as the unique identifier for each respective access-restricted content item based on an identifier for the content element, an asset identifier for the respective access-restricted content item, and the common trusted credentials.

\* \* \* \* \*